(12) United States Patent
Kawai et al.

(10) Patent No.: US 8,925,413 B2
(45) Date of Patent: Jan. 6, 2015

(54) ROLLING ELEMENT SCREW ASSEMBLY

(75) Inventors: Kotaro Kawai, Tokyo (JP); Harutaka Tsuiki, Tokyo (JP); Masanori Yoshino, Tokyo (JP); Kunio Takano, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 13/816,912

(22) PCT Filed: Jul. 27, 2011

(86) PCT No.: PCT/JP2011/067100
§ 371 (c)(1),
(2), (4) Date: Feb. 13, 2013

(87) PCT Pub. No.: WO2012/032871
PCT Pub. Date: Mar. 15, 2012

(65) Prior Publication Data
US 2013/0139629 A1 Jun. 6, 2013

(30) Foreign Application Priority Data
Sep. 6, 2010 (JP) ................................ 2010-198935

(51) Int. Cl.
F16H 25/22 (2006.01)

(52) U.S. Cl.
CPC ................................. F16H 25/2214 (2013.01)
USPC ................................... 74/424.86; 74/424.82

(58) Field of Classification Search
USPC .......................................... 74/424.81–424.87
See application file for complete search history.

(56) References Cited

U.S. PATENT DOCUMENTS

| 2,855,792 | A  | * | 10/1958 | Gates | ........................ 74/424.87 |
| 6,089,117 | A  |   | 7/2000  | Ebina et al. | |
| 6,681,651 | B2 | * | 1/2004  | Fujita | ........................ 74/424.86 |
| 7,516,681 | B2 | * | 4/2009  | Hsu | ........................ 74/424.86 |
| 2002/0026844 | A1 | * | 3/2002 | Fujita | ........................ 74/424.86 |
| 2005/0016308 | A1 |   | 1/2005 | Hayashi | |

(Continued)

FOREIGN PATENT DOCUMENTS

| JP | 58-169246 U | 11/1983 |
| JP | 3-086237 U  | 8/1991  |

(Continued)

OTHER PUBLICATIONS

International Search Report for PCT/JP2011/067100, mailing date of Nov. 1, 2011.

Primary Examiner — Troy Chambers
Assistant Examiner — Emily Cheng
(74) Attorney, Agent, or Firm — Westerman, Hattori, Daniels & Adrian, LLP

(57) ABSTRACT

The rolling element screw device includes: a screw shaft having a rolling element raceway groove; a nut member, which has a loaded rolling element raceway groove opposed to the rolling element raceway groove and is threadingly engaged with the screw shaft through intermediation of the rolling elements; and the circulation component, which includes a pair of the first circulating portions passing through a peripheral wall of the nut member, and the second circulating portion coupling the pair of first circulating portions together, to thereby form the endless circulation path for the rolling elements. Each of the first circulating portions includes a first cylindrical portion fitted into a circulation component mounting hole of the nut member, and a second cylindrical portion which has an outer diameter larger than an outer diameter of the first cylindrical portion. The first cylindrical portion includes a rolling element introducing hole.

4 Claims, 6 Drawing Sheets

(56) References Cited

U.S. PATENT DOCUMENTS

2005/0087031 A1* 4/2005 Ohkubo et al. ............ 74/424.85
2006/0032323 A1* 2/2006 Ohkubo et al. ............ 74/424.88
2009/0084212 A1* 4/2009 Niwa et al. ................. 74/424.87
2010/0107794 A1* 5/2010 Lin et al. .................... 74/424.83

FOREIGN PATENT DOCUMENTS

| JP | 6-037227 Y2 | 9/1994 |
| JP | 11-051049 A | 2/1999 |
| JP | 2002-098212 A | 4/2002 |
| JP | 2004-108454 A | 4/2004 |

* cited by examiner

ROLLING ELEMENT SCREW ASSEMBLY

BACKGROUND

The present invention relates to a rolling element screw device for converting a rotary motion into a linear motion, in which a nut member is threadingly engaged with a screw shaft through the intermediation of rolling elements.

As the above-mentioned rolling element screw device, for example, there is known a rolling element screw device of a type in which an endless circulation path for rolling elements is formed using a circulation component. The rolling element screw device of this type includes: balls as a large number of rolling elements; a screw shaft having an outer peripheral surface in which a spiral ball raceway groove is formed; a nut member which includes a spiral loaded rolling element raceway groove opposed to the ball raceway groove, and is threadingly engaged with the screw shaft through the intermediation of the balls; and a circulation component mounted to the nut member to form an endless circulation path for the balls (JP 11-51049 A).

The circulation component is formed into substantially a U-shape, and includes a pair of first circulating portions fitted onto a peripheral wall of the nut member, and a second circulating portion coupling the pair of first circulating portions together. The circulation component enables the balls to roll inside the circulation component from one of the first circulating portions to another one of the first circulating portions. Each of the first circulating portions is formed into a cylinder having substantially an elliptical cross-section, and in each of the first circulating portions, a ball introducing hole extending in a tangent direction along a lead angle of the loaded rolling element raceway groove is formed. On the other hand, a pair of pipe mounting holes, into which the first circulating portions of the circulation component are inserted, respectively, is formed in the nut member. The pair of pipe mounting holes is formed astride several turns of the loaded rolling element raceway groove of the nut member.

When the first circulating portions of the circulation component are fitted into the pipe mounting holes of the nut member, the following configuration is obtained. Specifically, each of the first circulating portions slightly protrudes from an inner peripheral surface of the nut member. The balls, which finish rolling on a loaded rolling element raceway track formed of the ball raceway groove of the screw shaft and the loaded rolling element raceway groove of the nut member, are scooped up into the circulation component to be brought out of the loaded rolling element raceway groove of the nut member, and then are returned to a start position of the loaded rolling element raceway track. That is, the circulation component is mounted to the nut member, and thus the endless circulation path for the balls is completed.
[PTL 1] JP 11-51049 A

SUMMARY

However, in the above-mentioned conventional rolling element screw device, the ball introducing hole formed in each first circulating portion needs to be inclined along the lead angle of the loaded rolling element raceway groove, and hence the first circulating portion is inevitably increased in size in the configuration of the first circulating portion having a uniform diameter. In addition, the balls roll in the circulation component including the second circulating portion and the pair of first circulating portions, and hence it is necessary to provide connection structure between the second circulating portion and the pair of first circulating portions in order not to hinder smooth circulation of the balls. Accordingly, in the configuration of the conventional first circulating portion, the first circulating portion is inevitably increased in size.

Along with increase in size of the first circulating portion, also the pipe mounting hole of the nut member, into which the first circulating portion is fitted, is inevitably increased in size. In a case where such a pipe mounting hole having a large diameter is formed in the nut member from a direction perpendicular to a center axis of the nut member, the loaded rolling element raceway groove is formed in the inner peripheral surface of the nut member at a predetermined lead angle, and hence there is a fear in that the pipe mounting hole interferes with the adjacent loaded rolling element raceway groove. In particular, in a case where the rolling element screw device has a small lead length and a large diameter of each rolling element, it has been difficult to form the pipe mounting hole.

Further, in a case where the circulation component includes the pair of first circulating portions and the second circulating portion, a joint is formed at a connection position between each of the first circulating portions and the second circulating portion. In this case, a difference in processing error between the first circulating portions and the second circulating portion is more likely to cause a step at the joint between each of the first circulating portions and the second circulating portion. This may hinder smooth circulation of the balls.

The present invention has been made in view of the above-mentioned problems, and therefore has an object to provide a rolling element screw device which can form an endless circulation path for rolling elements using a circulation component even in a case where a lead length is small and a diameter of each rolling element is large, and which is less likely to cause a step at the joint between each of the first circulating portions and the second circulating portion, to thereby have no adverse effect on circulation of the rolling elements.

In order to achieve the above-mentioned object, according to the present invention, there is provided a rolling element screw device, including: a screw shaft, which has an outer peripheral surface in which a rolling element raceway groove having a spiral shape is formed at a predetermined lead angle; a nut member, which includes a through-hole through which the screw shaft passes, the through-hole having an inner peripheral surface in which a loaded rolling element raceway groove having a spiral shape and opposed to the rolling element raceway groove is formed, the nut member being threadingly engaged with the screw shaft through intermediation of a large number of rolling elements that roll on the rolling element raceway groove and the loaded rolling element raceway groove; and a circulation component, which includes: a pair of first circulating portions passing through a peripheral wall of the nut member; and a second circulating portion coupling the pair of first circulating portions together, the circulation component linking both ends of the loaded rolling element raceway groove together to form an endless circulation path for the large number of rolling elements.

Further, the nut member includes a pair of circulation component mounting holes formed perpendicularly to a center axis of the nut member, and the pair of first circulating portions of the circulation component is mounted into the pair of circulation component mounting holes, respectively. On the other hand, each of the pair of first circulating portions includes: a first cylindrical portion fitted into each of the pair of circulation component mounting holes from a direction perpendicular to the center axis of the nut member; and a second cylindrical portion which has an outer diameter larger than an outer diameter of the first cylindrical portion and is provided at one end of the first cylindrical portion coaxially with the first cylindrical portion. Further, the first cylindrical portion includes a rolling element introducing hole which is continuous with the loaded rolling element raceway groove of the nut member and is formed to be inclined in a lead angle direction with respect to a center axis of the first cylindrical portion.

According to the rolling element screw device of the present invention, the circulation component mounting holes of the nut member, into which the first cylindrical portions are fitted, respectively, can also be set to have a small diameter. Therefore, the circulation component mounting holes do not interfere with the adjacent loaded rolling element raceway groove of the nut member, and the endless circulation path for the rolling elements can be formed using the circulation component even in the case where the lead length is small and the diameter of each rolling element is large.

DETAILED DESCRIPTION OF THE DRAWINGS

In the following, a ball screw device according to an embodiment of the present invention is described in detail with reference to the attached drawings.

Figure 1:
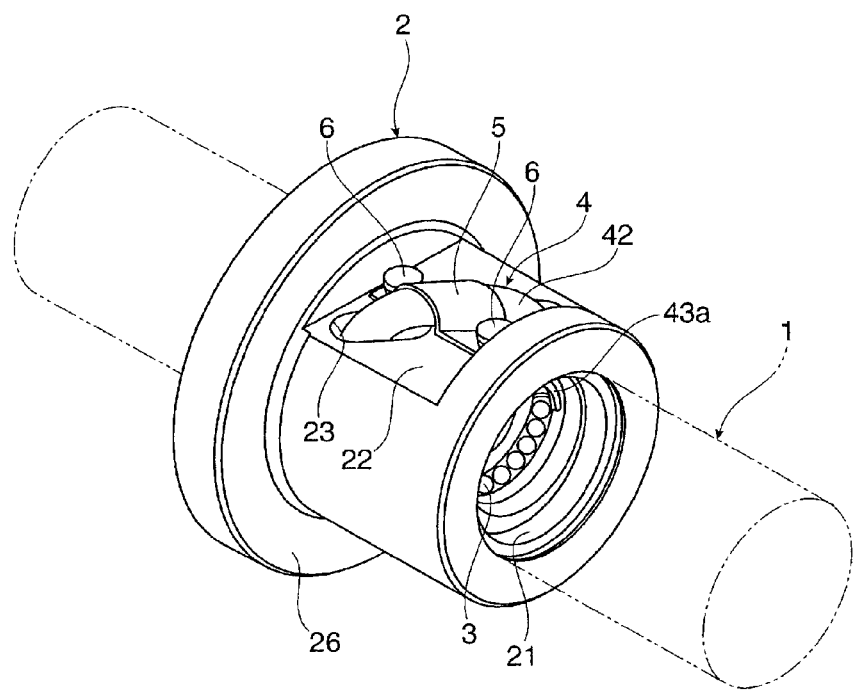
FIG. 1 A perspective view illustrating a ball screw device according to an embodiment of the present invention.

FIG. 1 is a perspective view illustrating the ball screw device according to the embodiment of the present invention. The ball screw device includes: a screw shaft 1 having an outer peripheral surface in which a spiral rolling element raceway groove, that is, a ball raceway groove is formed at a predetermined lead angle; a nut member 2 threadingly engaged with the screw shaft 1 through the intermediation of a large number of rolling elements, that is, balls 3; and a circulation component, that is, a hollow cylindrical return pipe 4, which includes a non-loaded rolling element passage on which the balls 3 roll in a non-loaded state, and is mounted to the nut member 2 to form an endless circulation path for the balls 3. Note that, for the sake of understanding of internal structure of the nut member 2, FIG. 1 illustrates the screw shaft 1 by a chain line.

The nut member 2 is formed into a cylindrical shape and includes a through-hole through which the screw shaft 1 passes. In an inner peripheral surface of the through-hole, a loaded rolling element raceway groove 21 that is opposed to the ball raceway groove of the screw shaft 1 is formed. The balls 3 roll, with the load applied thereto, in a loaded rolling element raceway track formed of the ball raceway groove of the screw shaft 1 and the loaded rolling element raceway groove 21 of the nut member 2. Further, a flat surface 22 is formed on an outer peripheral surface of the nut member 2, and a pair of fitting holes 23, into which the return pipe 4 is fitted, is formed in the flat surface 22. The pair of fitting holes 23 is formed to sandwich a center axis of the nut member 2 therebetween, and to extend in a direction perpendicular to the center axis of the nut member 2. The pair of fitting holes 23 is formed to extend through the inner peripheral surface of the nut member 2. Note that, a flange portion 26 for fixing the nut member 2 to a mechanical apparatus or the like is formed at one axial end of the nut member 2.

Figure 7:
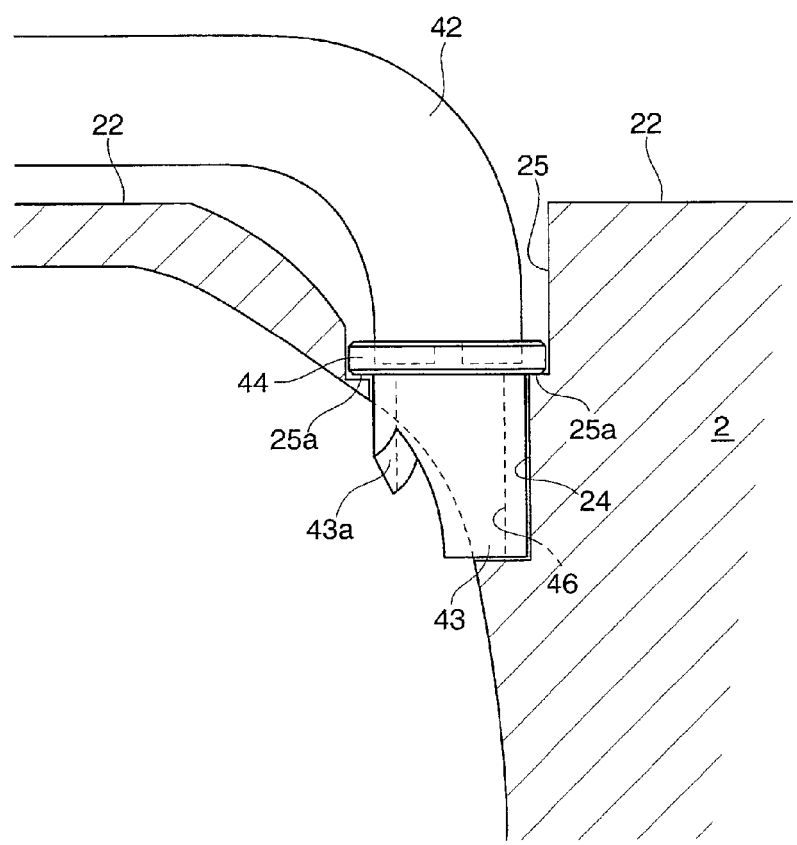
FIG. 7 An enlarged view illustrating a region in which the return pipe is coupled into a fitting hole formed in the nut member.

Each of the fitting holes 23 formed in the nut member 2 includes a circulation component mounting hole, that is, a pipe mounting hole 24 extending through the inner peripheral surface of the nut member 2, and an opening hole 25 that is continuous with the pipe mounting hole 24 through the intermediation of a step portion 25a and is open toward the flat surface 22 of the nut member 2 (see FIG. 7).

Figure 2:
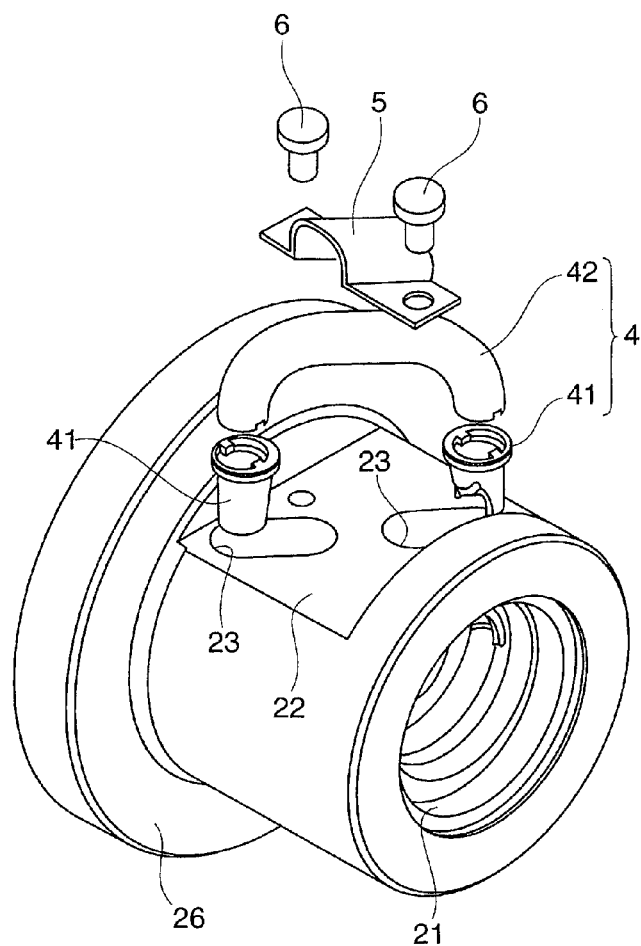
FIG. 2 An exploded perspective view illustrating a relationship between a nut member and a return pipe provided to the ball screw device of FIG. 1.

FIG. 2 is an exploded perspective view illustrating a relationship between the nut member 2 and the return pipe 4. Illustration of the screw shaft 1 and the balls 3 is omitted in FIG. 2. The return pipe 4 includes a pair of first circulating portions 41 respectively fitted into the fitting holes 23 of the nut member 2, and a second circulating portion 42 coupling the pair of first circulating portions 41 together. The return pipe 4 is formed into substantially a U-shape in overall view.

The return pipe 4 is fixed to the flat surface 22 of the nut member 2 with a fitting 5 and fixing screws 6 so as to be situated astride several turns of the loaded rolling element raceway groove 21 formed in the nut member 2. The balls 3, which roll and come to one end of the loaded rolling element raceway track of the nut member 2, enter the non-loaded rolling element passage in the return pipe 4 from one of the first circulating portions 41 so as to circulate through the non-loaded rolling element passage, and then are sent from another one of the first circulating portions 41 to another end of the loaded rolling element raceway track. That is, the return pipe 4 is fixed to the flat surface 22 of the nut member 2, and thus the loaded rolling element raceway track and the non-loaded rolling element passage of the return pipe 4 are coupled together, to thereby complete the endless circulation path for the balls 3.

In the nut member 2 illustrated in FIGS. 1 and 2, a single endless circulation path for the balls 3 is formed. A set of the return pipe 4 including the first circulating portions 41 and the second circulating portion 42 is fixed to the nut member 2 so as to correspond to the endless circulation path. Note that, in consideration of an allowable load, a size, and the like of the ball screw device, the number of sets of the return pipes 4 can be arbitrarily increased.

Figure 3:
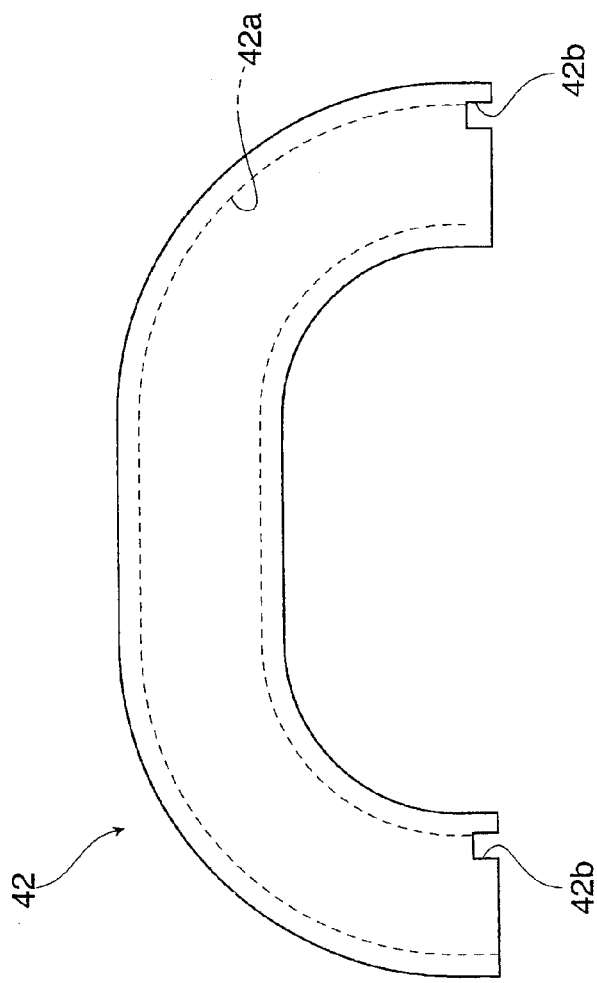
FIG. 3 A side view illustrating a second circulating portion of FIG. 2.

FIG. 3 is a side view illustrating the second circulating portion 42. The second circulating portion 42 is formed into a hollow cylindrical shape to include a guide hole 42a forming the non-loaded rolling element passage for the balls 3, and is formed into substantially a U-shape in overall view. The guide hole 42a is formed to have an inner diameter larger than a diameter of each ball 3. Further, at each end of the second circulating portion 42, there is formed a pair of recesses 42b into which protrusions 45a of each of the first circulating portions 41 described later are fitted. The pair of recesses 42b is opposed to each other through the intermediation of the guide hole 42a. Herein, the pair of recesses 42b is formed, but, instead of the pair of recesses, a single recess may be formed. Note that, the side view of FIG. 3 illustrates the second circulating portion 42 viewed from one direction, and hence only one of the recesses 42b is illustrated at each end portion of the second circulating portion 42.

Figure 4:
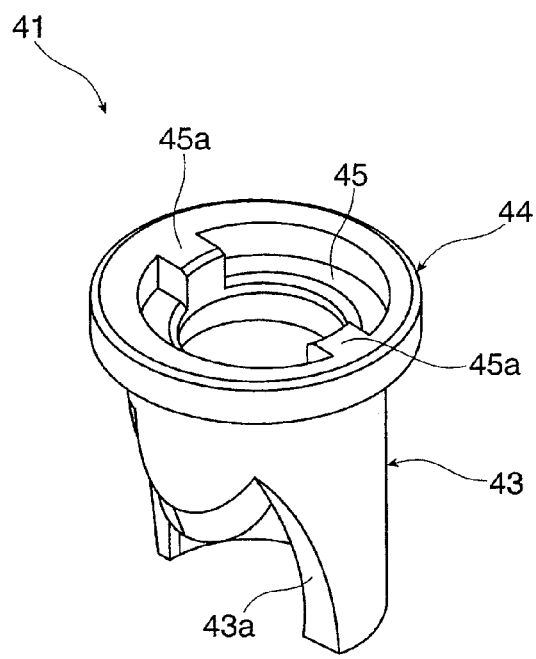
FIG. 4 A perspective view illustrating one of first circulating portions of FIG. 2.

On the other hand, FIG. 4 is a perspective view illustrating details of one of the first circulating portions 41. The first circulating portion 41 includes: a first cylindrical portion 43 which is fitted from a direction perpendicular to the center axis of the nut member 2 into the pipe mounting hole 24 formed in the nut member 2; and a second cylindrical portion 44 which is set to have an outer diameter larger than that of the first cylindrical portion 43, and is provided at one end of the first cylindrical portion 43 coaxially with the first cylindrical portion 43.

At an end portion of the first cylindrical portion 43 situated on an inner peripheral side of the nut member 2, there is formed a scooping portion 43a for scooping up, into the non-loaded rolling element passage of the return pipe 4, the balls 3 that have rolled on the loaded rolling element raceway groove 21 of the nut member 2. On the other hand, in the second cylindrical portion 44, there is formed an annular positioning step portion 45 onto which an end portion of the second circulating portion 42 is fitted. On the positioning step portion 45, there is formed the pair of protrusions 45a fitted into the recesses 42b formed in each end portion of the second circulating portion 42.

Figure 5:
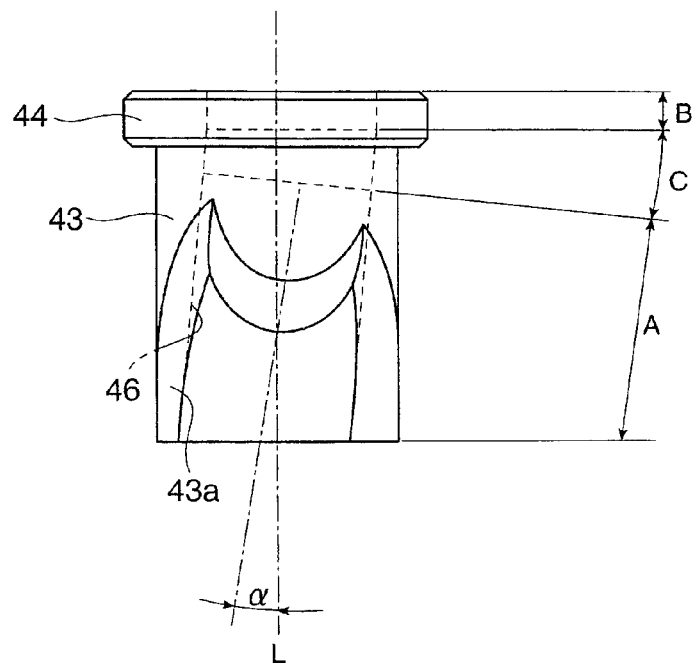
FIG. 5 A side view illustrating the first circulating portion of FIG. 4.

FIG. 5 is a side view illustrating one of the first circulating portions 41. In the first cylindrical portion 43 and the second cylindrical portion 44, a rolling element introducing hole, that is, a ball introducing hole 46 continuous with the loaded rolling element raceway groove 21 of the nut member 2 is formed. The ball introducing hole 46 is formed to have an inner diameter larger than the diameter of each ball 3, and forms the non-loaded rolling element passage for the balls 3 in cooperation with the guide hole 42a of the second circulating portion 42. That is, the ball introducing hole 46 guides, into the guide hole 42a of the second circulating portion 42, the balls 3 that have rolled on the loaded rolling element raceway groove 21 of the nut member 2.

The ball introducing hole 46 described above includes: an introducing region A formed in an inner peripheral surface of the first cylindrical portion 43 and inclined in a direction corresponding to a lead angle α of the loaded rolling element raceway groove 21 with respect to a center axis L of the first cylindrical portion 43; a coupling region B formed in an inner peripheral surface of the second cylindrical portion 44 perpendicularly to the center axis of the nut member 2, and coupled to the guide hole 42a of the second circulating portion 42; and an intermediate region C formed between the introducing region A and the coupling region B to curve at a certain curvature. That is, the positioning step portion 45 of the second cylindrical portion 44 is provided around the coupling region B of the ball introducing hole 46.

Figure 6:
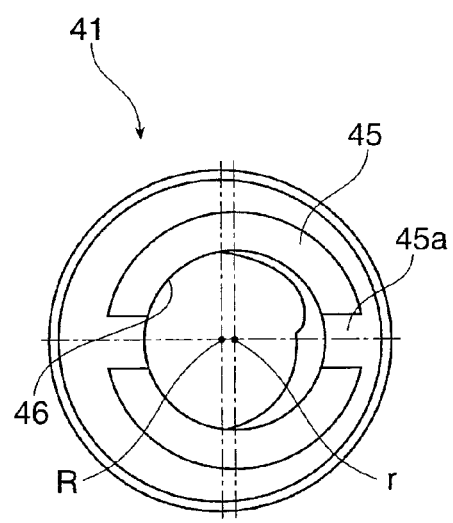
FIG. 6 A front view illustrating the first circulating portion of FIG. 4 viewed from a second cylindrical portion side.

As described above, the ball introducing hole 46 formed in the first cylindrical portion 43 and the second cylindrical portion 44 curves inside each of the first circulating portions 41. Accordingly, as illustrated in FIG. 6, a center axis r of the positioning step portion 45 provided around the coupling region B is displaced from a center axis R of the second cylindrical portion 44. That is, the second cylindrical portion 44 is formed to have an uneven thickness.

The recesses 42b of the second circulating portion 42 are fitted onto the protrusions 45a of each of the first circulating portions 41 configured as described above, and thus the second circulating portion 42 is positioned and fixed to the first circulating portions 41, to thereby complete the return pipe 4. Further, each of the first circulating portions 41 and the second circulating portion 42 are assembled to each other, and thus the ball introducing hole 46 of each of the first circulating portions 41 and the guide hole 42a of the second circulating portion 42 are coupled together, to thereby complete the non-loaded rolling element passage for the balls 3.

When the completed return pipe 4 is fitted into the fitting holes 23 of the nut member 2, as illustrated in FIG. 7, the first cylindrical portion 43 of each of the first circulating portions 41 forming the return pipe 4 is fitted into the pipe mounting hole 24 of each of the fitting holes 23, whereas the second cylindrical portion 44 is not fitted into the pipe mounting hole 24. However, the second cylindrical portion 44 is locked to the step portion 25a provided between the pipe mounting hole 24 and the opening hole 25, and is arranged in the opening hole 25. Note that, for the sake of easy understanding of a relationship between the fitting holes 23 of the nut member 2 and the first circulating portions 41, FIG. 7 illustrates only one of fitting regions between the fitting holes 23 and the first circulating portions 41.

Further, when the fitting 5 is fixed to the flat surface 22 of the nut member 2 with the fixing screws 6 from an upper side of the second circulating portion 42, the pair of first circulating portions 41 and the second circulating portion 42 are positioned and fixed to the nut member 2. At this time, as illustrated in FIG. 7, the scooping portion 43a of the first cylindrical portion 43 slightly protrudes from the inner peripheral surface of the nut member 2.

As described above, under a state in which the first cylindrical portion 43 is fixed into the pipe mounting hole 24 of the nut member 2, the introducing region A of the ball introducing hole 46 formed in the first cylindrical portion 43 is inclined in the direction corresponding to the lead angle α of the loaded rolling element raceway groove 21 of the nut member 2, and hence the balls 3 rolling on the loaded rolling element raceway groove 21 of the nut member 2 can be smoothly introduced into the guide hole 42a of the second circulating portion 42.

In the ball screw device according to the embodiment of the present invention configured as described above, for example, when the screw shaft 1 is rotated relative to the nut member 2, the balls 3, which have rolled between the ball raceway groove of the screw shaft 1 and the loaded rolling element raceway groove 21 of the nut member 2 with the load applied thereto, reach a position at which the scooping portion 43a of the first cylindrical portion 43 protrudes, and then are released from the load and brought out of the loaded rolling element raceway groove 21 of the nut member 2. After that, the balls 3 roll in a non-loaded state in the non-loaded rolling element passage of the return pipe 4 formed of the guide hole 42a of the second circulating portion 42 and the ball introducing hole 46 of each of the first circulating portions 41, and are returned to a position corresponding to several previous turns of the loaded rolling element raceway groove 21.

According to the above-mentioned ball screw device of the embodiment of the present invention, each of the first circulating portions 41 of the return pipe 4 includes the first cylindrical portion 43 and the second cylindrical portion 44. Further, only the positioning step portion 45, onto which an end portion of the second circulating portion 42 is fitted, is formed in the second cylindrical portion 44, whereas only the ball introducing hole 46 is formed in the first cylindrical portion 43. Accordingly, the first cylindrical portion 43 fitted into the pipe mounting hole 24 of the nut member 2 can be set to have a small diameter. That is, the pipe mounting hole 24 of the nut member 2, into which the first cylindrical portion 43 is fitted, can also be set to have a small diameter.

As described above, according to the ball screw device of the embodiment of the present invention, the pipe mounting hole 24 of the nut member 2 can be set to have a small diameter. Accordingly, the pipe mounting hole 24 does not interfere with the adjacent loaded rolling element raceway groove 21 of the nut member 2, and the endless circulation path for the balls 3 can be formed using the return pipe 4 even in a case where a lead length is small and a ball diameter is large.

Further, according to the ball screw device of the embodiment of the present invention, the coupling region B of the ball introducing hole 46 formed in each of the first circulating portions 41 is formed perpendicularly to the center axis of the nut member 2, and hence a cross-section of an inner diameter of the ball introducing hole 46 on the coupling region B side exhibits a single circle. Accordingly, the recesses 42b of the second circulating portion 42 are only fitted onto the protrusions 45a of the positioning step portion 45, and thus it is possible to accurately position the inner diameter of the ball introducing hole 46 of each of the first circulating portions 41 and the inner diameter of the guide hole 42a of the second circulating portion 42. As a result, it is possible to ensure smooth circulation of the balls 3.

The invention claimed is:

1. A rolling element screw device, comprising:
a screw shaft, which has an outer peripheral surface in which a rolling element raceway groove having a spiral shape is formed at a predetermined lead angle;
a nut member, which comprises a through-hole through which the screw shaft passes, the through-hole having an inner peripheral surface in which a loaded rolling element raceway groove having a spiral shape and opposed to the rolling element raceway groove is formed, the nut member being threadingly engaged with the screw shaft through intermediation of a large number of rolling elements that roll on the rolling element raceway groove and the loaded rolling element raceway groove; and
a circulation component, which comprises:
 a pair of first circulating portions passing through a peripheral wall of the nut member; and
 a second circulating portion coupling the pair of first circulating portions together,
 the circulation component linking the two ends of the loaded rolling element raceway groove together to form an endless circulation path for the large number of rolling elements,
wherein the nut member comprises a pair of circulation component mounting holes formed perpendicularly to a center axis of the nut member, and the pair of first circulating portions of the circulation component is mounted into the pair of circulation component mounting holes, respectively,
wherein each of the pair of first circulating portions comprises:
 a first cylindrical portion fitted into each of the pair of circulation component mounting holes from a direction perpendicular to the center axis of the nut member; and
 a second cylindrical portion which has an outer diameter larger than an outer diameter of the first cylindrical portion and is provided at one end of the first cylindrical portion coaxially with the first cylindrical portion, and
wherein the first cylindrical portion comprises a rolling element introducing hole which is continuous with the loaded rolling element raceway groove of the nut member and is formed to be inclined in a lead angle direction with respect to a center axis of the first cylindrical portion, and
wherein the second cylindrical portion comprises a positioning step portion onto which an end portion of the second circulating portion is fitted, the positioning step portion having an annular shape and being formed around the rolling element introducing hole,
wherein a center of the positioning step portion is displaced from a center axis of the second cylindrical portion, and
wherein each of the circulation component mounting holes comprises a pipe mounting hole into which the first cylindrical portion is fitted and an opening hole into which the second cylindrical portion is fitted; and
an inner diameter of the pipe mounting hole is smaller than an inner diameter of the opening hole.

2. The rolling element screw device according to claim 1, wherein
the second circulating portion comprises a recess formed at an end portion thereof, and
the positioning step portion of the second cylindrical portion comprises a protrusion fitted into the recess of the second circulating portion.

3. The rolling element screw device according to claim 1, wherein the rolling element introducing hole comprises:
an introducing region formed in the first cylindrical portion and inclined in the lead angle direction of the loaded rolling element raceway groove with respect to the center axis of the first cylindrical portion;
a coupling region formed in the second cylindrical portion perpendicularly to the center axis of the nut member, and coupled to the second circulating portion; and
an intermediate region formed between the introducing region and the coupling region to curve at a certain curvature.

4. The rolling element screw device according to claim 1, wherein a step portion is formed between the pipe mounting hole and the opening hole.

\* \* \* \* \*